United States Patent [19]
Nakamura et al.

[11] Patent Number: 5,818,803
[45] Date of Patent: Oct. 6, 1998

[54] APPARATUS FOR DRIVING AN INFORMATION RECORDING MEDIUM AND A METHOD FOR DRIVING SAME

[75] Inventors: Tomoaki Nakamura; Terumitsu Okamoto, both of Ohta, Japan

[73] Assignee: NEC Corporation, Japan

[21] Appl. No.: 888,683

[22] Filed: Jul. 7, 1997

[30] Foreign Application Priority Data

Jul. 5, 1996 [JP] Japan .................................. 8-176147

[51] Int. Cl.⁶ .................................................. G11B 7/09
[52] U.S. Cl. ................................. 369/44.28; 369/44.34
[58] Field of Search .......................... 369/44.28, 44.27, 369/44.34, 44.35, 44.29, 43, 32, 47

[56] References Cited

U.S. PATENT DOCUMENTS 5,003,524  3/1991  Ikeda ..................................... 369/44.28

FOREIGN PATENT DOCUMENTS 5182382   7/1993  Japan .
5282807  10/1993  Japan .
61260432A 11/1996  Japan .

Primary Examiner—Muhammad N. Edun
Attorney, Agent, or Firm—Hayes, Soloway, Hennessey, Grossman & Hage, P.C.

[57] ABSTRACT

After application of power or insertion of a medium, a frequency bandpass digital filter extracts the first-order component, which has one period per revolution of the medium, and the second-order component, which has two periods per revolution of the medium, from the carriage operation amount for one revolution of the medium, this being written into a carriage operation amount compensation table. Then, a position error averaging section calculates the average value of a tracking error signal, and a compensation table updating judgment section monitors this position error average value. If the position error average exceeds a prescribed threshold value for a number of consecutive sectors, the second-order component only is updated in the carriage operation amount compensation table. An actuator driving section controls the carriage in accordance with a corrected operation amount obtained by adding the operation amount obtained at the carriage operation amount calculation section and the compensation amount of the carriage compensation table. The results in stable position control of the head, without the influence of ambient temperature changes on the off-track amount.

23 Claims, 4 Drawing Sheets

APPARATUS FOR DRIVING AN INFORMATION RECORDING MEDIUM AND A METHOD FOR DRIVING SAME

BACKGROUND OF THE INVENTION

1. Field of the Invention

The present invention relates to a disk driving apparatus (disk apparatus), and more specifically to technology for compensation of the amount of operation of a carriage in a disk apparatus that drives, for example, a floppy disk.

2. Description of Related Art

There have been technologies for the purpose of performing off-track compensation, such as disclosed in the Japanese Unexamined Patent Publication (KOKAI) No. 5-182382.

In the above-noted publication, the method disclosed is that of first storing into memory the average off-track compensation value and the direction value for movement of the carriage obtained for each track in the data region, and then, after performing a seek operation to the target track, reading in from memory the off-track compensation value and direction value for the target track to perform off-track compensation.

In this prior art method, once an off-track compensation value is stored there is no means of updating the off-track compensation value.

In the Japanese Unexamined Patent Publication (KOKAI) No. 5-282807, there is disclosed a method of updating an off-track compensation table in accordance with a time schedule.

Specifically, a time table for execution of measurement of the off-track amount is stored in memory, an off-track measurement means provided in the magnetic disk apparatus being used in accordance with this time schedule to measure the off-track amount for each data disk with respect t to the carriage reference position on the servo disk, the compensation table being updated based on these measured values.

The above-noted compensation table updating method, however, does not include a function for eliminating high-order components of the off-track amount.

For this reason, except in the case of a hard disk apparatus, in which the carriage is light, so that the operating bandwidth (servo bandwidth) is wide, in the case, for example, of a floppy disk apparatus, because it is not possible for the carriage to track such high-order components, if the measured off-track data are stored as is in the compensation table, high-order components have an adverse effect on carriage operation, and it is not possible to sufficiently reduce the off-track amount.

An additional problem in the case of a floppy disk medium is that shrinking and expansion of the medium caused by changes in the ambient temperature cause a change in the off-track amount, which has two periods in one revolution of the medium, this change being dependent on the ambient temperature.

In this case, if the ambient temperature changes from room temperature to either a high temperature or a low temperature, this change in off-track amount causes the actual off-track amount to increase, resulting in read errors and write errors.

In view of the above-noted drawbacks in the prior art, an object of the present invention is to provide an apparatus for driving an information recording medium such as a disk apparatus which is capable of performing off-track compensation that effectively reduces the off-track amount, without an increase in off-track amount caused by the ambient temperature.

SUMMARY OF THE INVENTION

To achieve the above-noted object, the present invention has basically the following technical conception in that an apparatus for driving an information recording medium comprising, a driving means for rotating an information recording medium; a head means for recording and play-backing a predetermined information to or from the information recording medium; a head driving means for causing the head means to perform a seeking operation; and an controlling means for controlling each operation of the respective means as mentioned above, wherein the controlling means further comprising; an off-track detection means for detecting an amount of off-track value and generating a tracking-error signal; a carriage operation amount calculation means for calculating an amount of carriage operation based on the tracking-error signal so that the tracking error signal is zero; a compensation table including data that corresponds to a first-order component of the amount of carriage operation, which has one period during one revolution of the recording medium, and a data that corresponds to the second-order component of the amount of carriage operation, which has two periods during one revolution of the recording medium; and an adding means for selectively adding the amount of carriage operation and at least one of the first-order component and the second-order component thereof and generating a corrected operation amount for the head driving means to control thereof.

In accordance with the present invention, it is a characteristic point that an amount of carriage operation to correct the detected off-track value, i. e., so called the tracking error signal, to be zero is adjusted at least by either one of a first-order component of the amount of carriage operation or a second-order component thereof and thus the apparatus for driving an information recording medium of the present invention has a compensation table for the purpose of compensating the off-track amount of the head, and a means for updating the compensation table while the recording medium is revolving.

The above-noted compensation table includes a data that corresponds to the first-order component of the amount of carriage operation, corresponding to the data to adjust the off-track amount thus detected to be zero, and which has one period during one revolution of the recording medium, and a data that corresponds to the second-order component of the amount of carriage operation, which has two periods during one revolution of the recording medium.

According to the disk apparatus of the present invention, the compensation table does not include high-order off-track amount components of third or higher orders which cause unstable carriage operation.

Therefore, even in a disk apparatus in which the carriage is heavy and the operating bandwidth thereof is narrow, high-order components of the off-track compensation amount do not have an adverse effect on the head control and, because the second-order component of the off-track amount, which has two periods per revolution of the medium, is also eliminated in accordance with the compensation table, there is a reduction in the head off-track amount which accompanies a change in the ambient temperature.

DETAILED DESCRIPTION OF THE PREFERRED EMBODIMENTS

Preferred embodiment of the apparatus for driving an information recording medium will be described hereunder with reference to the accompanied drawings.

Figure 1:
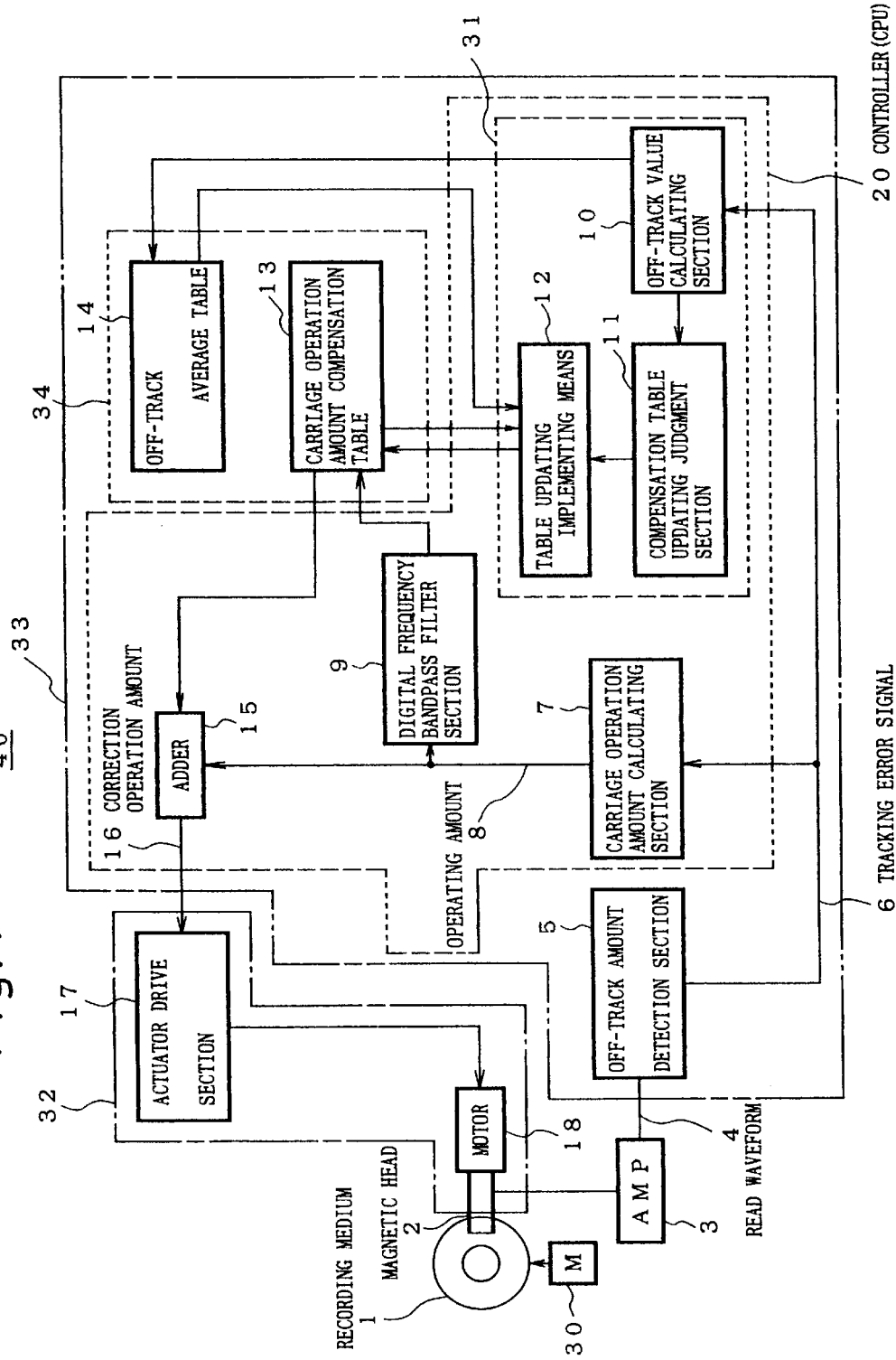
FIG. 1 is a block diagram which shows an embodiment of a disk apparatus according to the present invention.

FIG. 1 shows a block diagram of one embodiment of the apparatus for driving an information recording medium of the present invention in that it is shown that an apparatus 40 for driving an information recording medium comprising, a driving means, such as a spindle motor 30 for rotating an information recording medium 1; a head means 2 for recording and play-backing a predetermined information to or from the information recording medium 1; a head driving means 32 comprising an actuator 17 and a head driving motor 18, for causing the head means 2 to perform a seeking operation; and an controlling means 33 for controlling each operation of the respective means as mentioned above, wherein the controlling means 33 further comprising; an off-track amount detection means 5 for detecting an amount of off-track value and generating a tracking-error signal 6; a carriage operation amount calculation means 7 for calculating an amount of carriage operation 8 based on the tracking-error signal 6 so that the tracking error signal 6 is near zero; a compensation table 13 including data that corresponds to a first-order component of the amount of carriage operation, which has one period during one revolution of the recording medium, and a data that corresponds to the second-order component of the amount of carriage operation, which has two periods during one revolution of the recording medium; and an adding means 15 for adding the amount of carriage operation 8 and at least one of the first-order component and the second-order component thereof and generating a corrected operation amount 16 for the head driving means 32 to control the head means.

In a preferred embodiment of the apparatus for driving an information recording medium according to the present invention, after inserting the medium into the apparatus for driving an information recording medium and starting the rotation of the medium, the off-track amount is measured for each sector and the amount of carriage operation which can adjust the tracking error signal to be zero, is calculated and then an FFT (fast Fourier transform) is performed on the amount of carriage operation during a revolution of the medium, and extraction is performed of the amount of carriage operation having one period per revolution of the medium (first-order component) and the amount of carriage operation having two periods per revolution of the medium (second-order component).

Based on the results thereof, an operating amount compensation table 13 is generated for each sector provided in the information recording medium 1.

Accordingly, in the apparatus for driving an information recording medium of the present invention, the controlling means 33 is preferably further provided with a filter means 9 for extracting the first-order component and second-order component of the amount of carriage operation 8 therefrom and which is connected to the carriage operation amount calculation means 7 and the compensation table 13.

And in the present invention, the filter means 9 preferably, for example performs a fast Fourier transform of data related to the amount of carriage operation 8 to cancel the off-track amount, i.e., the tracking error signal 6 of the head 2 during revolution of the medium 1, and calculates data that corresponds to the first-order component and the second order component of the amount of carriage operation 8.

Further in the present invention, the compensation table 13 may comprise at least two memory means for storing the first-order component and second-order component generated from the filter means 9, respectively.

Figure 4:
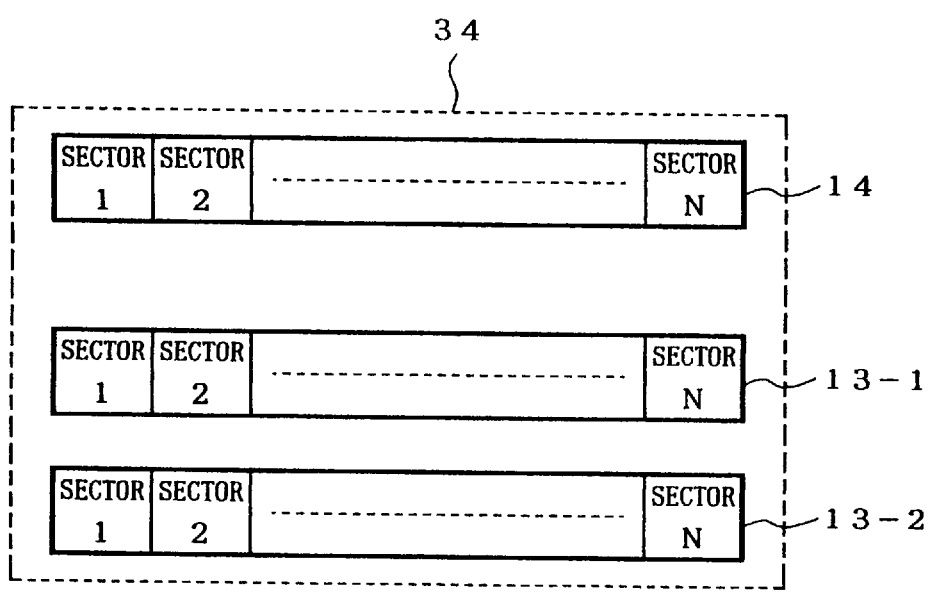
FIG. 4 is a block diagram which shows one-embodiment of a construction used for the memory means for compensation table and off-track average amount table.

As shown in FIG. 4, the compensation table 13 is provided in a table containing section 34 and it comprises a first compensation table 13-1 for storing the first-order component of the amount of carriage operation 8 and a second compensation table 13-2 for storing the second order component of the amount of carriage operation 8.

Each of the first and second compensation tables 13-1 and 13-2 is further separated into a plurality of sub-memory sections each of which can store a plurality of the first-order component and second-order component of the amount of carriage operation 8 obtained from each one of the sectors of the medium, respectively.

Note that in the present invention, each of the memory means 13-1 and 13-2 can be initialized by data of the first-order component or the second-order component of the amount of carriage operation 8 generated from the filter means 9, respectively, only during when the information recording medium 1 is rotated for the first one rotation.

And accordingly, in the present invention, the filter means 9 is effective only when the information recording medium 1 is rotated for the first one rotation and for the rest of its rotation, i.e., for the second one rotation, the third one rotation and so on, the filter means 9 is in non-operating condition.

On the other hand, in the present invention, it is preferred that the first-order component as stored in the compensation table 13 is used fixedly as it is stored and no updating operation is applied thereto while the second-order component as stored in the compensation table 13 can be updated in response to a change in a condition of the amount of the tracking error signal 6.

Note that, in updating the above-noted compensation table while the medium is revolving, first the average value of off-track amounts (position error amounts) for each sector is calculated, these being stored into the off-track average amount table 14 which is also provided in the table containing section 34 as shown in FIG. 4, as an off-track average amount table, this being progressively updated as the medium revolves.

If the the average value of off-track amounts exceeds a predetermined threshold value consecutively for a several number of sectors, a judgment is made that it is time to update the compensation table 13, then a second-order component of the average value of off-track amounts of the respective sectors included in the off-track average amount table 14 is extracted by means of a digital filter 21 which is provided in the table updating implementing means 12 and then adjusted operating amount data corresponding to this being determined, the second-order component of the operating amount included in the compensation table 13 being updated based on this adjusted operating amount data.

A specific embodiment of the present invention is described below in detail, with reference being made to the relevant accompanying drawings.

FIG. 1 is a block diagram which shows the configuration of one embodiment of an apparatus for driving an information recording medium of the present invention, which is, for example, a floppy disk driving apparatus.

The floppy disk driving apparatus has a magnetic head 2, which is supported by a carriage (not shown), tracking controlled, and which reads out a magnetic signal from a floppy disk 1, an actuator drive section 17 and motor 18 which perform position control of the carriage that supports the magnetic head 2, an amplifier 3 which amplifies the electrical signal sent from the magnetic head 2, an off-track amount detection section 5 which extracts a tracking error signal 6 from the output of the amplifier 3, a controller (CPU) 20 which generates, from the tracking error signal 6, an operation amount signal 8 for the purpose of controlling the position of the magnetic head 2, and a memory 34 which is associated with the controller 20.

The magnetic head 2 reads out not only the recorded data but also servo information which is recorded onto the floppy disk (medium) 1, and further it also can record information into the information recording medium 1.

And the off-track amount detection section 5 extracts from the read waveform read from the magnetic head 2, a tracking error signal 6 corresponding to the servo information.

The controller 20 has a carriage operation amount calculation section 7 which calculates the amount of carriage operation 8, based on the tracking error signal 6 generated from the off-track detection section 5, so that the tracking error signal 6 is near zero, a frequency bandpass digital filter 9 which, by eliminating higher order components of third or higher order, extracts from the operation amount 8 that is calculated at the carriage operation amount calculation section 7, the first-order component, which has one period per revolution of the medium 1 and the second-order component, which has two periods per revolution of the medium 1.

The controller 20 further has an average value of the off-track value calculating section 10, i.e., a position error averaging section, which progressively measures the off-track amount, such as the amount of the tracking error signal 6, of each one of the sectors of the information recording medium 1, as the medium 1 revolves, and accordingly averages these for each sector so as to determine the average value of the tracking error signal 6, and a compensation table judgment section 11 which monitors the average value of the off-track amount value that is calculated by the average value of the off-track value calculating section 10 and which, when the average value of the off-track values of several consecutive sectors exceed a prescribed threshold value as movement is made, makes a judgment that it is time to update the carriage operation amount compensation table 13.

And further the controller 20 has a table updating implementing means 12 which updates the second-order component of the amount of carriage operation stored in the carriage operation amount compensation table 13 based on the judgment of the compensation table judgment section 11, and an adder 15 which adds at least one of the first-order component and the second-order component of said amount of carriage operation 8 for each one of the sectors of the information recording medium as stored in the compensation table 13 to the amount of carriage operation 8, once at every rotation of the information recording medium thereby obtaining the corrected operation amount 16.

The actuator drive section 17 drives the motor 18, based on the corrected operation amount 16, which is the output of the adder 15.

The carriage operation amount compensation table 13 is a table which is stored in the table containing section 34, and the initial values thereof being stored by the frequency bandpass digital filter 9, when the information recording medium 1 is rotated for its first rotation and the values of the first-order component for each of the sectors of the information recording medium 1 stored in the compensation table 13, is fixed and the value is constantly used as long as the same information recording medium 1 used.

On the other hand, the values of the second-order component for each of the sectors of the information recording medium 1 stored in the compensation table 13, can be varied and being updated under a certain condition about the tracking error signal 6.

In each one of the fields in this table, the first-order components, which have one period per revolution of the medium 1 and the second-order components, which have two periods per revolution of the medium 1 as mentioned above, are stored.

The off-track average amount table 14 which is also provided in the table containing section 34, and having a plurality of sub-sections and each one of said subsections has the off-track average amount data for respective sectors of the information recording medium 1, generated from the average value of the off-track value calculating section 10, and being used to judge the time when updating should be performed.

As explained above, the controlling means 33 of the present invention further preferably provided with a table updating means 31 which comprises; an average value calculating section 10 which progressively calculates an average value of off-track amount corresponding to the tracking error signal 6, for each sector position of the information recording medium; a compensation table updating judging means 11 which, when the average values thereof exceed a prescribed threshold value, makes a judgment that the data corresponding to the second-order component be updated; and a table updating implementing means 12 for generating an actual update data for the second-order component, as well as a off-track average amount table 14 for storing the average value of off-track amount calculated by the off-track value calculating section 10.

Figure 2:
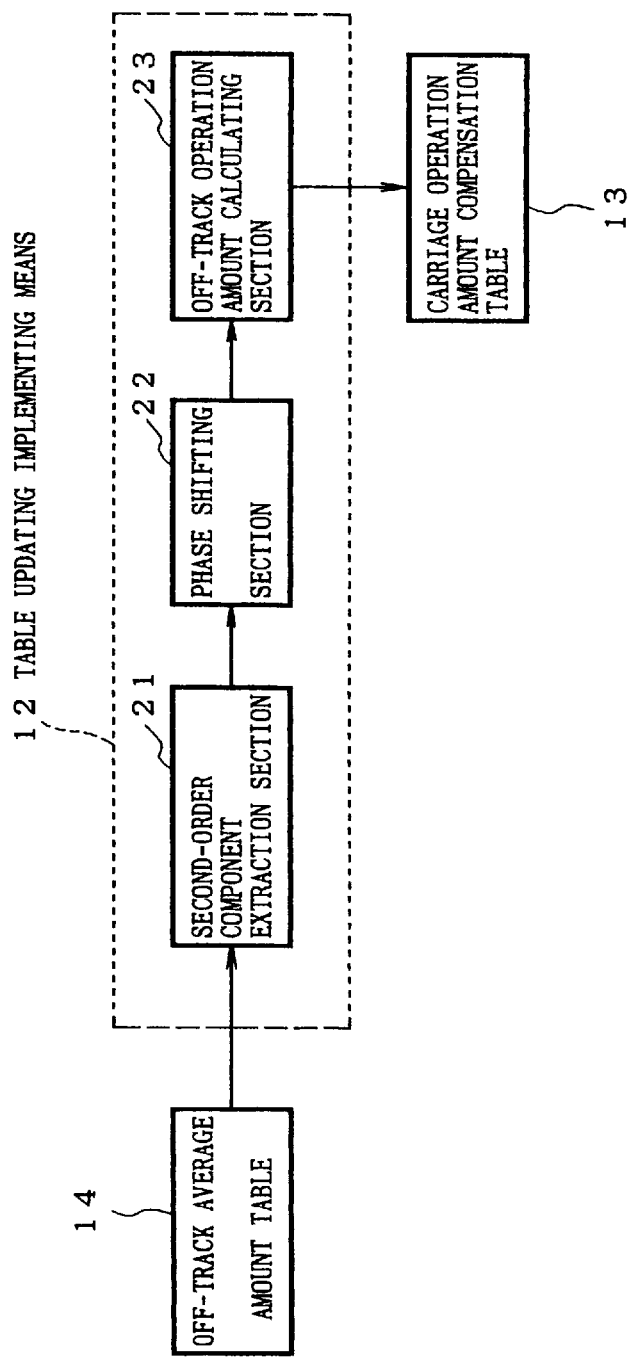
FIG. 2 is a block diagram which shows the detailed configuration of the compensation table updating part which is shown in FIG. 1.

In the present invention, one specific embodiment of the table updating implementing means is shown in FIG. 2.

As shown in FIG. 2, the table updating implementing means 12 may comprise; a second-order component extracting section 21 extracting the second-order component of the average value of the off-track amount from the average value of off-track amount stored in the off-track average amount table 14; a phase shifting section 22 performing to shift the phase of the second-order component by an amount of a delay in the response of the head driving means; and a off-track-operation amount calculating section 23 which calculates an operation amount data with respect to the second-order component of the average value of the off-track amount extracted by the second-order component extracting section 21.

Referring to FIG. 2, we see a more-detailed configuration of the table updating implementing means 12 that is shown in FIG. 1.

The table updating implementing means 12 as a second-order component extracting section 21, a phase shifting section 22, and a position error-operation amount calculation section 23.

The second-order component extracting section 21 extracts the second-order component, which has two periods in one revolution of the medium 1, from the off-track average values in the off-track average amount table 14, by performing an FFT (fast Fourier transform).

The phase shifting section 22 shifts the phase of the output of the second-order component extracting section 21 by the amount of the delay in the response of the motor 18.

The position error-operation amount calculating section 23 receives the output of the phase shifting section 22 and calculates the operation amount data with respect to that off-track amount.

The position error-operation amount calculation section 23 performs the calculation in accordance with the ratio between the position error amount corresponding to the amount of a track pitch on the floppy disk 1 and the amount of operation necessary to move the magnetic head over a distance equal to the track pitch, this being used to update the second-order component in the carriage operation amount compensation table 13.

As apparent from the explanations about the apparatus for driving an information recording medium, a method for driving an information recording medium of the present invention as the second aspect of the present invention may, for example, comprises the following steps such as:

detecting an amount of off-track value and generating a tracking-error signal 6;

calculating an amount of carriage operation 8 based on the tracking-error signal 6 so that the tracking error signal is near zero;

feeding back the amount of carriage operation 8 to the head driving means 32 to control an operation of the head means 2, as a corrected operation amount;

extracting a first-order component and a second-order component of the amount of carriage operation 8 therefrom; and selectively adding at least one of the first-order component and a second-order component of the amount of carriage operation 8 as extracted to the amount of carriage operation 8 before the amount of carriage operation 8 is output to the head driving means.

And the method of for driving an information recording medium of the present invention may preferably be provided with a step of storing each one of the first-order component and a second-order component in memory means 13, respectively, between the extracting step and the adding step.

Further the method of the present invention may further be provided with a step of updating the second-order component stored in the memory means 13 in response to a change in a condition of the amount of the tracking error signal 6.

More precisely, the step of updating is carried out when each one of average values of an off-track amounts corresponding to the tracking error signals, for several successive sector positions in the information recording medium, exceed a prescribed threshold value.

Figure 3:
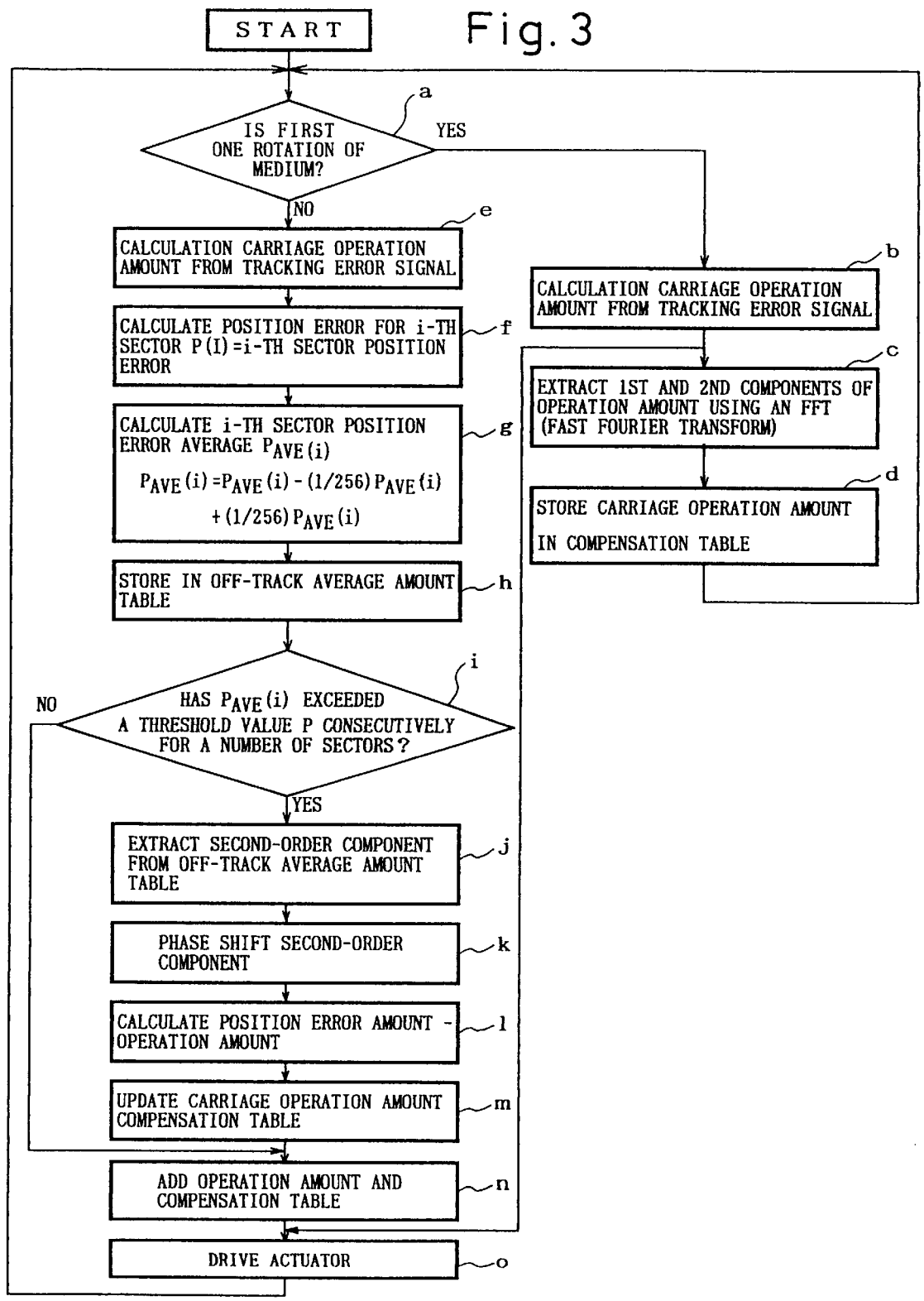
FIG. 3 is a flowchart which shows the processing in the disk apparatus which is shown in FIG. 1.

FIG. 3 is a flowchart which shows processing performed to execute one specific embodiment of the above-mentioned method of the present invention, especially to execute the an off-track compensation using firmware in the above-described floppy disk apparatus.

First, the condition of whether or not the rotation of the floppy disk (medium 1) is the first one rotation is detected (step a), and if YES in the step a, that means that the rotation of the medium 1 is the first one rotation, the off-track amount in another word, the tracking error signal 6, for each sector thereof for the first one revolution of the medium 1, is measured, progressive conversion of this being made to the carriage operation amount 8, based on the ratio of the position error for a track pitch and the operation amount required to move the head by the track pitch in the carriage operation amount calculation means 7, while it is directly applied to the head driving means 32 and go to the step c mentioned below(step b).

Next, the frequency bandpass digital filter 9 is used to perform an FFT on the thus-converted carriage operation amounts for one revolution of the medium 1, thereby extracting the first-order component, which has one period per revolution of the medium 1, and the second-order component, which has two periods per revolution of the medium 1 (step c), these values being written into the carriage operation amount compensation table 13 that is provided in the table containing section 34, for example, RAM or the like (step d).

On the other hand, in the step a, if the rotation of the medium 1 is not the first one rotation is detected, the medium 1 was not inserted or the power not applied, the carriage operation amount calculation means 7 calculates the carriage operation amount 8 from the tracking error signal 6, as the same manner as done in the step b(step e).

And simultaneously with this step e, the average value of off-track value calculating section 10 extracts the off-track amounts, i.e., the tracking error signal, for each sector for the purpose of calculating the average value of the off-track value.

For the purpose of this description, let the off-track amount for the i-th sector be P(i) (in step f). The moving average value of the off-track amount for 256 sectors is calculated as the average value of the off-track value(step g)

Supposing that the average value of the off-track value for i-th sector of the information recording medium 1 is represented by $P_{AVE}$ (i), the $P_{AVE}$ (i) can be obtained by the following formula;

$$P_{AVE}(i) = P_{AVE}(i) - (1/256)P_{AVE}(i) + (1/256)P_{AVE}(i)$$

Note that the initial value of $P_{AVE}$ (i) is near zero.

The average value of the off-track value P AVE (i) for the i-th sector thus obtained, is stored in the i-th position in the off-track average amount table 14 within the memory (RAM) (step h).

When doing this, if the average values of the off-track value of a several successive sectors simultaneously exceed a prescribed threshold value P, the compensation table updating judgment section 11 judges that it is time to update the carriage operation amount compensation table 13 (step i).

For example, if the table updating is performed in the case in which the value is greater than this threshold value P for 3 consecutive sectors, this would correspond to the condition in which two sectors ago $P_{AVE}$ (i−2)>P, at the previous sector $P_{AVE}$ (i−1)>P, and at the current sector $P_{AVE}$ (i)>P, which if satisfied, would cause updating.

If the average value of the off-track value $P_{AVE}$ (i) is greater than the threshold value P for a number of consecutive sectors, the table updating implementing means12 makes use of an FFT to extract the second-order component of the average value of the off-track value, which has two period per revolution of the medium 1, from the off-track average amount table 14 (step j), the phase of the second-order component of the average value of the off-track value being shifted by the amount of the motor phase lag (step k), the result being converted to operation amount data (step 1), and being used to update only the second-order component in the carriage operation amount compensation table 13 stored in memory (RAM) 13(step m).

Then, at the adder 15 the operation amount 8 which was determined at step e and the carriage operation amount compensation value obtained from the carriage operation amount compensation table 13, including both of the first and the second -order component of the amount of carriage operation 8, are added to each other at the adder 15 to generate a corrected operation amount 16, the carriage being driven (step o) by the actuator driving section 17, based on this corrected operation amount 16.

Thus, by adding the first-order and second-order components to the carriage operation amount as off-track compensation amounts, it is possible to sufficiently reduce the off-track amount.

In a floppy disk apparatus, the first component, caused by off-center of the medium, and the second component, caused by expansion and contraction of the medium are generally the largest contributing factors in the off-track amount, these components falling within the servo bandwidth.

By adding only the first-order and the second-order components as operation amounts, it is possible to remove high-order components which are outside the servo bandwidth and which would thus cause unstable servo operation.

By doing this, it is possible to perform tracking control of the head with stable access of the target track, without lowering the servo gain. Because the large first-order and second-order components can be compressed, it is possible to sufficiently compress the off-track amount.

As explained above, the one embodiment of the method for driving an information recording medium of the present invention is further comprises the steps of:

calculating average values of off-track amount corresponding to the tracking error signal 6, for each one of sector positions in the information recording medium 1, respectively;

storing the average values of off-track amount in an off-track average amount table 14;

determining whether or not each one of average values of an off-track amounts, for several successive sector positions in the information recording medium 1, exceed a prescribed threshold value;

extracting a second-order component of the average value of off-track amount therefrom, stored in the off-track average amount table 14, if when each one of the average values of an off-track amounts for several successive sector positions in the information recording medium 1, exceeded a prescribed threshold value;

shifting a phase of the second-order component by an amount of a delay in the response of the head driving means 32;

calculating an operation amount data with respect to the extracted second-order component of the off-track amount; and updating the second-order component currently stored in the memory means 13 by replacing with the newly calculated operation amount data.

In the present invention, the step of extracting is carried out only when the information recording medium 1 is rotated in the first one rotation so as to initialize the memory means.

And further, the amount of carriage operation 8 as calculated by the carriage operation amount calculation means 7 is directly fed backed to the head driving means 32 at a period when the information recording medium is rotated in the first one rotation, while the step of adding is carried out by adding both of the first-order component and a second-order component of the amount of carriage operation amount 8 as stored in the compensation table 13 to the amount of carriage operation amount 8, at each time when the information recording medium 1 is rotated in the second one rotation and successive one rotation.

As explained above, in the present invention, the filter means 9 extracts both of the first-order component of the amount of carriage operation 8 and the second-order component thereof only one time when the information recording medium 1 is rotated for the first one rotation immediately just after the information recording medium 1 is started to rotate and both components are stored in the each sectors of the respective compensation table 13-1 and 13-2.

Note that the role of the filter means 9 is effective only for the first one rotation of the medium 1 and thus the compensation table 13 is completed just after the first one rotation of the medium 1 has been completed.

Mean while, the off-track average amount data calculated by the average value of the off-track value calculating section 10 for each sector of the medium for one rotation thereof are also stored in the respective sub-section of the off-track average amount table.

Although, these operation is always repeated at every one of rotation of the medium 1, at the first one rotation of the medium 1, since the compensation table 13 has not yet completed, no data is available from the compensation table 13 and thus the adder 15 receives only the carriage operation amount 8 output from the carriage operation amount calculation means 7 and output same to the head driving means 32 as the corrected as the carriage operation amount.

On the other hand, after the first one rotation of the medium 1, at each one of the one rotation, i.e., the second one rotation, the third one rotation and so on, the adder 15 receives the above mentioned carriage operation amount 8 and the first-order component and the second-order component of the amount of carriage operation 8, as stored in the compensation table 13.

Under a conventional method for driving the information recording medium in that only the amount of carriage operation 8 is used without adding the first and the second-components of the amount of carriage operation 8 extracted therefrom, when noise is applied or a head operation is fluctuated, the tracking error signal usually does not represent an accurate positional information of the head and accordingly, in this case, the first and the second-components of the off-track value cannot be sufficiently reduced.

On the other hand, in the present invention, since the first and the second-components of the carriage operation amount 8, which are used to move the head are previously stored and both of the first and the second-components thereof is added to the current carriage operation amount 8 in every rotation of the medium to generate the corrected carriage operation amount 16.

Accordingly, in the present invention, even if the tracking error signal is fluctuated, the certain amount of the corrected carriage operation amount 16 is always generated so as to effectively reduce the the first and the second-components of the off-track value.

On the other hand, since the above-mentioned second component is changed due to expansion or shrinking of the medium 1 caused by a change in ambient temperature, an amplitude of the second-component having two period during one revolution of the medium, that is to say the more higher the temperature is, the more the amplitude thereof is increased.

Therefore, in the present invention, on or after the second one rotation of the medium, the average amount of the off-track value for each sectors of the medium are monitored and then a decision when the value of the second-component of the carriage operation amount 8 for the head, currently stored in the compensation table 13 should be updated, can be made in the response to the average amount of the off-track value have been changed.

Especially on or after the third one rotation in the present invention, the tracking error signal 6, the amount of which is corresponding to the value that cannot be reduced by the second-component of the the carriage operation amount 8, as stored in the compensation table 13, and used at the previous one rotation of the medium 1, is generated but the amount of the first and the second-components thereof included in the latest generated tracking error signal 6 are minimized.

As mentioned above, in the present invention, an amount of moving distance of the head 2 controlled by the carriage operation amount 8 obtained by calculating the tracking error signal 6 as an operation amount value, and an amount of moving distance of the head 2 controlled by the operation amount value summing up the first and the second component as stored in the compensation table 13, are added to each other and therefore the head can be controlled to move so that the tracking error signal 6 is near zero.

Although in the conventional method, when the tracking error could not be accurately extracted, the first and the second component thereof would not sufficiently be reduced, in the present invention, the first and the second component thereof can always and effectively be reduced.

As mentioned above, one specific embodiment of the present invention is a method for driving an information recording medium which comprising:

a driving means for rotating an information recording medium;

a head means for recording and play-backing a predetermined information to or from the information recording medium ;

a head driving means for causing the head means to perform a seeking operation; and an controlling means for controlling each operation of the respective means as mentioned above, wherein the method comprises the steps of:

detecting an amount of off-track value and generating a tracking-error signal;

determining whether or not the rotation of the information recording medium is the first one rotation;

calculating an amount of carriage operation based on the tracking-error signal so that the tracking error signal is near zero;

feeding back the amount of carriage operation directly to the head driving means to control an operation of the head means, as a corrected operation amount when the rotation of the information recording medium is the first one rotation;

extracting a first-order component and a second-order component of the amount of carriage operation from the amount of carriage operation and storing both of the first-order component and a second-order component in a memory means when the rotation of the information recording medium is the first one rotation;

adding both of the first-order component and a second-order component as stored in the memory means to the amount of carriage operation as output from the carriage operation amount calculation means to generate a corrected operation amount to control the head driving means when the rotation of the information recording medium is not the first one rotation;

And in that the method as mentioned above, it may further include the following process in that when the rotation of the information recording medium is not the first one rotation, the method is further comprising the steps of:

calculating average values of off-track amount corresponding to the tracking error signal for each one of sector positions in the information recording medium, respectively;

storing the average values of off-track amount for each one of the sector portion thereof in an off-track average amount table;

determining whether or not each one of average values of an off-track amounts for several successive sector positions in the information recording medium, exceed a prescribed threshold value;

extracting a second-order component of the average value of off-track amount therefrom, stored in the off-track average amount table, when each one of the average values of an off-track amounts for several successive sector positions in the information recording medium, exceed a prescribed threshold value;

shifting a phase of the second-order component by an amount of a delay in the response of the head driving means;

calculating an operation amount data with respect to the extracted second-order component of the off-track amount; and updating the second-order component currently stored in the memory means by replacing with the newly calculated operation amount data.

In the present invention, the above-mentioned method for driving the information recording medium can be applied to the apparatus as mentioned in the afore-mentioned explanation and as shown in FIG. 1 and also it can control the apparatus by applying the software as mentioned above to the controlling means 33 including a central controlling means such as CPU 20.

Therefore, another aspect of the present invention is such that a recording medium including therein a program for controlling means of an apparatus for driving an information recording medium through a CPU, comprising:

a driving means for rotating an information recording medium;

a head means for recording and play-backing a predetermined information to or from said information recording medium ;

a head driving means for causing said head means to perform a seeking operation; and an controlling means for controlling each operation of the respective means as mentioned above, said program can control said controlling means utilizing a CPU means and said program comprising the steps of:

detecting an amount of off-track value and generating a tracking-error signal;

determining whether or not the rotation of said information recording medium is the first one rotation;

calculating an amount of carriage operation based on said tracking-error signal so that said tracking error signal is near zero;

feeding back said amount of carriage operation directly to said head driving means to control an operation of said head means, as a corrected operation amount when said rotation of said information recording medium is the first one rotation;

extracting a first-order component and a second-order component of said amount of carriage operation from said amount of carriage operation and storing both of said first-order component and a second-order component in a memory means when said rotation of said information recording medium is the first one rotation;

adding both of said first-order component and a second-order component as stored in said memory means to said amount of carriage operation as output from said carriage operation amount calculation means to generate a corrected operation amount to control said head driving means when said rotation of said information recording medium is not the first one rotation;

The recording medium as mentioned above, further comprises the following steps in that when said rotation of said information recording medium is not the first one rotation, said program is further comprising the steps of:

calculating average values of off-track amount corresponding to said tracking error signal for each one of sector positions in said information recording medium, respectively;

storing said average values of off-track amount for each one of said sector portion thereof in an off-track average amount table;

determining whether or not each one of average values of an off-track amounts for several successive sector positions in said information recording medium, exceed a prescribed threshold value;

extracting a second-order component of said average value of off-track amount therefrom, stored in said off-track average amount table, when each one of said average values of an off-track amounts for several successive sector positions in said information recording medium, exceed a prescribed threshold value;

shifting a phase of said second-order component by an amount of a delay in the response of said head driving means;

calculating an operation amount data with respect to said extracted second-order component of said off-track amount; and updating said second-order component currently stored in said memory means by replacing with said newly calculated operation amount data.

In the above-described embodiment, as described in detail, the position error average value for each sector is constantly monitored, so that if the position error average value is large for a number of consecutive sectors, the second-order component of the carriage operation amount compensation table is updated.

By doing this, it is possible to sufficiently compress the off-track amount component that has two periods per one revolution of the medium, this component occurring as a result of ambient temperature changes which cause expansion and contraction of the medium.

The above has been a detailed description of a preferred embodiment of the present invention. It will be apparent, however, to a person skilled in the art, that a disk apparatus according to the present invention is not limited to one having the configuration used in the foregoing description, and can be a disk apparatus having a variety of differences with respect to the above-noted configuration. For example, while in the above-noted embodiment the first-order and second-order components of the operation amount were stored in memory as a compensation table, it is also possible to store the first-order and second-order components of the offset compensation amount as the data in a table in memory.

As described in detail above, in a disk apparatus according to the present invention by performing off-track compensation by eliminating the first-order and the second-order components of the off-track amount, it is possible to perform stable tracking control with a small off-track amount.

The result is that the present invention provides a disk apparatus that is capable of highly reliable read/write operation.

What is claimed is:

1. An apparatus for driving an information recording medium comprising:

a driving means for rotating an information recording medium;

a head means for recording and play-backing a predetermined information to or from said information recording medium;

a head driving means for causing said head means to perform a seeking operation; and an controlling means for controlling each operation of the respective means as mentioned above, wherein said controlling means further comprising:

an off-track detection means for detecting an amount of off-track value and generating a tracking-error signal;

a carriage operation amount calculation means for calculating an amount of carriage operation based on said tracking-error signal so that said tracking error signal is near zero;

a compensation table including data that corresponds to a first-order component of said amount of carriage operation, which has one period during one revolution of said recording medium, and a data that corresponds to a second-order component of said amount of carriage operation, which has two periods during one revolution of said recording medium; and an adding means for adding said amount of carriage operation and at least one of said first-order component and said second-order component thereof and generating a corrected operation amount for said head driving means to control thereof.

2. An apparatus for driving an information recording medium according to claim 1, wherein said controlling means further provided with a filter means for extracting said first-order component and second-order component of said amount of carriage operation therefrom and which is connected to said carriage operation amount calculation means and said compensation table.

3. An apparatus for driving an information recording medium according to claim 2, wherein said filter means performs a fast Fourier transform of data related to said amount of carriage operation to cancel said off-track amount of said head during revolution of said medium, and calculates data that corresponds to said first-order component and said second order component of said amount of carriage operation.

4. An apparatus for driving an information recording medium according to claim 2, wherein said compensation table comprises at least two memory means for storing said first-order component and second-order component generated from said filter means, respectively.

5. An apparatus according to claim 4, each of said memory means further comprises a plurality of sub-sections each of which can store said first-order component or said second-order component of said amount of carriage operation each corresponding to each one of sectors of said information recording medium.

6. An apparatus according to claim 4, each of said memory means can be initialized by data of said first-order component or said second-order component of said amount of carriage operation generated from said filter means, respectively, only during when said information recording medium is rotated at the first one rotation.

7. An apparatus according to claim 6, said second-order component as stored in said compensation table can be updated in response to a change in a condition of said amount of said tracking error signal.

8. An apparatus according to claim 7, wherein said controlling means further provided with a table updating means comprising:

an average value calculating section which progressively calculates an average value of off-track amount corresponding to said tracking error signal, for each sector position, in said information recording medium;

a compensation table updating judging means which, when said average value exceeds a prescribed threshold value, makes a judgment that the data corresponding to said second-order component be updated; and a table updating implementing means for generating an actual update data for said second-order component.

9. An apparatus according to claim 8, wherein said controlling means further provided with a off-track average amount table for storing said average value of off-track amount calculated by said average value calculating section.

10. An apparatus according to claim 9, wherein said table updating implementing means comprises;

a second-order component extracting section extracting said component from said average value of off-track amount stored in said off-track average amount table;

a phase shifting section 22 performing to shift the phase of said second-order component by an amount of a delay in the response of said head driving means; and an off-track-operation amount calculating section which calculates an operation amount data with respect to said second-order component of said off-track extracted by said second-order component extracting section.

11. An apparatus according to claim 2, filter means is effective only when said information recording medium is rotated at the first one rotation.

12. A method for driving an information recording medium which comprising:

a driving means for rotating an information recording medium;

a head means for recording and play-backing a predetermined information to or from said information recording medium;

a head driving means for causing said head means to perform a seeking operation; and a controlling means for controlling each operation of the respective means as mentioned above, wherein said method comprises the steps of:

detecting an amount of off-track value and generating a tracking-error signal;

calculating an amount of carriage operation based on said tracking-error signal so that said tracking error signal is near zero;

feeding back said amount of carriage operation to said head driving means to control an operation of said head means, as a corrected operation amount;

extracting a first-order component and a second-order component of said amount of carriage operation therefrom; and selectively adding at least one of said first-order component and a second-order component of said amount of carriage operation as extracted to said amount of carriage operation before said amount of carriage operation is output to said head driving means.

13. A method for driving an information recording medium according to claim 12, wherein said method is further provided with a step of storing each one of said first-order component and a second-order component in memory means, respectively, between said extracting step and said adding step.

14. A method for driving an information recording medium according to claim 13, wherein said method is further provided with a step of updating said second-order component stored in said memory means in response to a change in a condition of said amount of said tracking error signal.

15. A method for driving an information recording medium according to claim 14, wherein said step of updating is carried out when each one of average values of an off-track amounts corresponding to said tracking error signals, for several successive sector positions in said information recording medium, exceed a prescribed threshold value.

16. A method for driving an information recording medium according to claim 15, wherein said step of updating is further comprises the steps of:

calculating average values of off-track amount corresponding to said tracking error signal, for each one of sector positions in said information recording medium, respectively;

storing said average values of an off-track amount in an off-track average amount table;

determining whether or not each one of average values of an off-track amount, for several successive sector positions in said information recording medium, exceed a prescribed threshold value;

extracting a second-order component of said average value of off-track amount therefrom, stored in said off-track average amount table, if when each one of said average values of an off-track amount for several successive sector positions in said information recording medium, exceeded a prescribed threshold value;

shifting a phase of said second-order component by an amount of a delay in the response of said head driving means;

calculating an operation amount data with respect to said extracted second-order component of said off-track amount; and updating said second-order component currently stored in said memory means by replacing with said newly calculated operation amount data.

17. A method for driving an information recording medium according to claim 12, wherein said step of extracting is carried out only when said information recording medium is rotated in the first one rotation so as to initialize said memory means.

18. A method for driving an information recording medium according to claim 12, wherein said amount of carriage operation as calculated by said carriage operation amount calculation means is directly fed backed to said head driving means at a period when said information recording medium is rotated in the first one rotation.

19. A method for driving an information recording medium according to claim 12, wherein said step of adding is carried out by adding both of said first-order component and a second-order component of said amount of carriage operation as stored in said memory means to said amount of carriage operation, at each time when said information recording medium is rotated in the second one rotation and successive one rotation.

20. A method for driving an information recording medium which comprising:
- a driving means for rotating an information recording medium;
- a head means for recording and play-backing a predetermined information to or from said information recording medium;
- a head driving means for causing said head means to perform a seeking operation; and
- a controlling means for controlling each operation of the respective means as mentioned above,
- wherein said method comprises the steps of:
  - detecting an amount of off-track value and generating a tracking-error signal;
  - determining whether or not the rotation of said information recording medium is the first one rotation;
  - calculating an amount of carriage operation based on said tracking-error signal so that said tracking error signal is near zero;
  - feeding back said amount of carriage operation directly to said head driving means to control an operation of said head means, as a corrected operation amount when said rotation of said information recording medium is the first one rotation;
  - extracting a first-order component and a second-order component of said amount of carriage operation from said amount of carriage operation and storing both of said first-order component and a second-order component in a memory means when said rotation of said information recording medium is the first one rotation;
  - adding both of said first-order component and a second-order component as stored in said memory means to said amount of carriage operation as output from said carriage operation amount calculation means to generate a corrected operation amount to control said head driving means when said rotation of said information recording medium is not the first one rotation.

21. A method for driving an information recording medium according to claim 20, wherein when said rotation of said information recording medium is not the first one rotation, said method is further comprising the steps of:
- calculating average values of an off-track amount corresponding to said tracking error signal for each one of sector positions in said information recording medium, respectively;
- storing said average values of an off-track amount for each one of said sector portion thereof in an off-track average amount table;
- determining whether or not each one of average values of an off-track amount for several successive sector positions in said information recording medium, exceed a prescribed threshold value;
- extracting a second-order component of said average value of an off-track amount therefrom, stored in said off-track average amount table, when each one of said average values of an off-track amount for several successive sector positions in said information recording medium, exceed a prescribed threshold value;
- shifting a phase of said second-order component by an amount of a delay in the response of said head driving means;
- calculating an operation amount data with respect to said extracted second-order component of said off-track amount; and
- updating said second-order component currently stored in said memory means by replacing with said newly calculated operation amount data.

22. A recording medium including therein a program for controlling means of an apparatus for driving an information recording medium comprising:
- a driving means for rotating an information recording medium;
- a head means for recording and play-backing a predetermined information to or from said information recording medium;
- a head driving means for causing said head means to perform a seeking operation; and
- a controlling means for controlling each operation of the respective means as mentioned above,
- said program can control said controlling means utilizing a computer means and said program comprising the steps of:
  - detecting an amount of off-track value and generating a tracking-error signal;
  - determining whether or not the rotation of said information recording medium is the first one rotation;
  - calculating an amount of carriage operation based on said tracking-error signal so that said tracking error signal is near zero;
  - feeding back said amount of carriage operation directly to said head driving means to control an operation of said head means, as a corrected operation amount when said rotation of said information recording medium is the first one rotation;
  - extracting a first-order component and a second-order component of said amount of carriage operation from said amount of carriage operation and storing both of said first-order component and a second-order component in a memory means when said rotation of said information recording medium is the first one rotation;
  - adding both of said first-order component and a second-order component as stored in said memory means to said amount of carriage operation as output from said carriage operation amount calculation means to generate a corrected operation amount to control said head driving means when said rotation of said information recording medium is not the first one rotation.

23. A recording medium according to claim 22, wherein when said rotation of said information recording medium is not the first one rotation, said program is further comprising the steps of:
- calculating average values of off-track amount corresponding to said tracking error signal for each one of sector positions in said information recording medium, respectively;
- storing said average values of off-track amount for each one of said sector portion thereof in an off-track average amount table;

determining whether or not each one of average values of an off-track amounts for several successive sector positions in said information recording medium, exceed a prescribed threshold value;

extracting a second-order component of said average value of off-track amount therefrom, stored in said off-track average amount table, when each one of said average values of an off-track amounts for several successive sector positions in said information recording medium, exceed a prescribed threshold value;

shifting a phase of said second-order component by an amount of a delay in the response of said head driving means;

calculating an operation amount data with respect to said extracted second-order component of said off-track amount; and updating said second-order component currently stored in said memory means by replacing with said newly calculated operation amount data.

\* \* \* \* \*

UNITED STATES PATENT AND TRADEMARK OFFICE
CERTIFICATE OF CORRECTION

PATENT NO. : 5,818,803
DATED : October 6, 1998
INVENTOR(S) : Nakamura et al

It is certified that error appears in the above-identified patent and that said Letters Patent is hereby corrected as shown below:

Face Page, Item [75] "Ohta" should be - -Gunma- -.

Signed and Sealed this

Twenty-first Day of December, 1999

Attest:

Q. TODD DICKINSON

Attesting Officer     Acting Commissioner of Patents and Trademarks